UNITED STATES PATENT OFFICE.

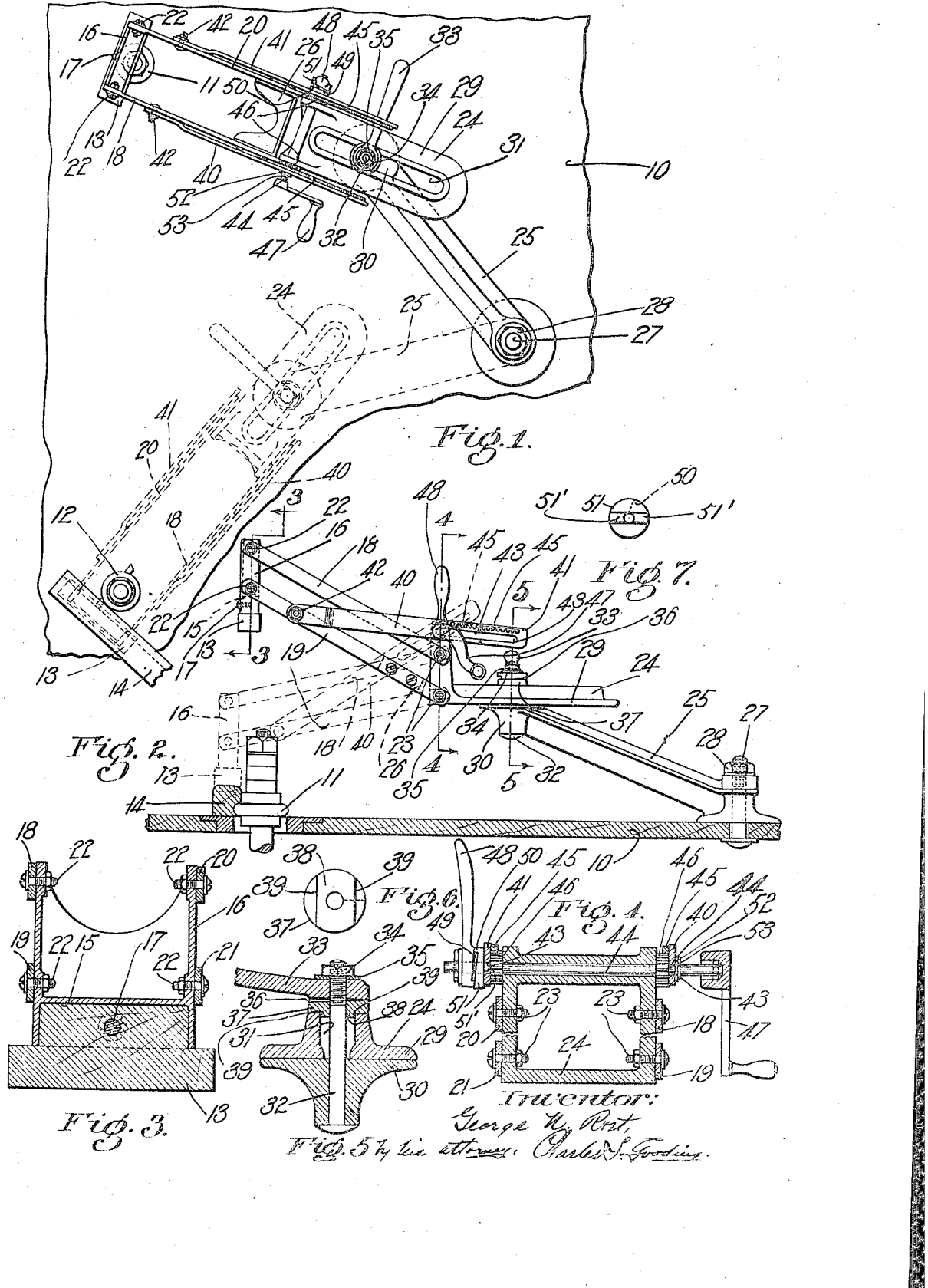

GEORGE N. ROST, OF BOSTON, MASSACHUSETTS.

SAFETY DEVICE FOR ROTARY MOLDING-MACHINES.

1,247,723.  Specification of Letters Patent.  Patented Nov. 27, 1917.

Application filed June 11, 1917. Serial No. 173,965.

*To all whom it may concern:*

Be it known that I, GEORGE N. ROST, a subject of King George V of England, residing at Boston, in the county of Suffolk and State of Massachusetts, have invented new and useful Improvements in Safety Devices for Rotary Molding-Machines, of which the following is a specification.

This invention relates to a device for use in connection with molding machines, the object of the invention being to provide a device which will hold the work down on the table of a molding machine and at the same time will provide a guard whereby the workman will be protected against injury by the rotary cutter of the molding machine.

The invention consists in the combination and arrangement of parts set forth in the following specification and particularly pointed out in the claims thereof.

Referring to the drawings:

Figure 1 is a plan view of my improved hold down and guard, showing the same attached to a portion of the table of a variety molding machine and being shown in full lines in position with relation to one cutter and in dotted lines with relation to another cutter of said molding machine.

Fig. 2 is a side elevation, partly in section, of the device showing the same elevated from the work in full lines and in contact with the work in dotted lines.

Fig. 3 is an enlarged sectional elevation taken on line 3—3 of Fig. 2.

Fig. 4 is a sectional elevation taken on line 4—4 of Fig. 2.

Fig. 5 is a sectional elevation taken on line 5—5 of Fig. 2.

Fig. 6 is an underneath plan of a clamp collar.

Fig. 7 is a plan view of a clamp collar.

Like numerals refer to like parts throughout the several views of the drawings.

In the drawings, 10 is a table of a variety molding machine and 11 and 12 are rotary cutters to which rotation is imparted by means well known to those skilled in the art. 13 is a guard member which performs the function of holding a piece of wood 14, to be operated upon by the cutters, down upon the work-table 10 and also acts as a guard to prevent the operator from bringing his hands into contact with either one of the rotary cutters 11 or 12.

The guard member 13 projects into a recess 15 in a holder 16 and is fastened securely thereto by a screw 17. The holder 16 is supported upon two pairs of parallelly arranged links 18 and 19, 20 and 21 and is pivotally connected thereto by pivots 22. The opposite ends of said links are connected by pivots 23 to a bracket 24, said bracket being rotatably and slidably mounted upon a support 25 which, in turn, is rotatably mounted upon the work-table 10. The links 19 and 21 are rigidly connected together by a bracket 26.

The support 25 is rigidly fastened to the work-table 10 by means of a bolt 27 and nut 28. When it is desired to change the position of the support 25 so that the guard member 13 may be used in connection with the cutter 12 instead of the cutter 11, the nut 28 is turned upon the bolt 27 to release the support 25 so that it can be rotated from the position shown in full lines (Fig. 1) to that illustrated in dotted lines in said figure. Said support 25 is then clamped firmly to the work-table 10 by tightening the nut 28 on the bolt 27.

The bracket 24 is provided with a flange 29 which rests upon a flange 30 on the support 25, and said bracket 24 is also provided with a slot 31 through which a clamp bolt 32 projects, and rotatably mounted upon the upper end of said clamp bolt 32 is a clamp lever 33. A nut 34 has screw-threaded engagement with the upper end of said bolt 32 and bears against a collar 35 which rests against the upper side of the clamp lever 33.

The under side of the clamp lever 33 is provided with a cam-shaped projection 36, the under surface of which is inclined and bears against a similarly inclined upper surface of a collar 37. Said collar 37 is provided with a projection 38 having flattened sides 39 (Figs. 5 and 6), and said projection 38 extends downwardly from the collar 37 into the slot 31, thus preventing said collar from rotating when the lever 33 is rotated to clamp the bracket 24 to the support 25.

By rotating the clamp lever 33 in the proper direction, the bracket 24 will be unclamped from the support 25 allowing said bracket, together with the parts supported thereon, including the links 18, 19, 20 and 21 and the guard member 13, to be moved longitudinally of the slot 31 or to be rotated about the pivotal bolt 32, so as to adjust the guard member 13 to any desired position relatively to the cutter 11 or the cutter 12.

The guard member 13 may be moved toward or away from the work-table 10 by means of a pair of slides 40 and 41 which are pivotally connected at their forward ends at 42 to the links 19 and 21. Said slides are each provided with a slot 43 through which projects a shaft 44. The slides 40 and 41 have fastened to their inner faces racks 45 which mesh into gears 46 fast to said shaft 44. Said shaft 44 is rotated by means of a handle 47 fast thereto and is locked in position by a handle 48 having an inclined surface 49 which bears against an inclined surface 50 on a collar 51 which is mounted upon the shaft 44. The collar 51 has two ears 51' projecting laterally therefrom and into the slot 43 in the slide 41.

A collar 52 on the shaft 44 bears against the outer face of the slide 40 and is held against longitudinal movement upon said shaft outwardly from the slide 40 by a pin 53.

By moving the handle 48 in the proper direction the inclined surface 49 thereon, bearing against the inclined surface on the clamp collar 51, causes the slides 40 and 41 to be clamped against the gears 46 and thus clamped to said shaft 44. Upon reversing the movement of the handle 48 the slides 40 and 41 will be free to move longitudinally of their respective slots 43 upon the shaft 44, and by rotating said shaft 44, by means of the handle 47, the gears 46, meshing into the racks 45, will cause the slides 40 and 41 to move longitudinally thereof and thus, by their connection with the links 19 and 21, will rock the links 19 and 21, 18 and 20 upon their respective pivots so as to raise or lower the holder 16 and the guard member 13 fast thereto from the position shown in dotted lines (Fig. 2) to that shown in full lines in said figure and vice versa.

The general operation of the mechanism hereinbefore specifically and to some extent in general described is as follows: Assuming the parts to be in the position illustrated in Fig. 1, the guard member 13 being held in contact with the upper surface of the work 14 which is to be molded by means of the rotary molding cutter 11, the workman pushes the work 14 along beneath said guard member and in contact with the cutter 11, the guard member 13 pressing upon the top of the work 14 with sufficient force to hold it against the work-table while it is being operated upon by said cutter 11. The guard member is held in the position referred to by the links 18, 19, 20 and 21, the rack slides 40 and 41, the gears 46 and the shaft 44, which shaft is locked against rotation by the clamp collar 51 and the clamp handle 48. The guard member 13, it will be noted, extends longitudinally of the work 14 between the operator and the cutter 11 and to a sufficient extent so that when said operator is pushing the work 14 along beneath said guard member his hand will come in contact with the end of the guard member 13 at a substantial distance from the cutter, and thus prevent his hand from engaging the cutter.

When the work has been completed and it is desired to insert a new piece of work beneath the guard member to be operated upon by the cutter, the operator releases said guard member by moving the handle 48 in the proper direction to unclamp the slide 40 and then raises said guard member by rotating the handle 47 as hereinbefore described. He then removes the piece of work which has been completed, inserts a new piece of work and holds it against the work-table 10 by rotating the handle 47 until said guard member bears with slight force against the top of the work, whereupon he clamps said guard member in position by means of the handle 48 and the mechanism connected thereto hereinbefore described.

While the guard member 13 has been described in the foregoing specification as attached to a holder 16, it is evident that without departing from the spirit of my invention the holder 16 and the guard 13 may be made in one piece, and in the claims wherein the guard member is set forth as a separate element from the holder it is to be understood that an equivalent construction would be one in which the guard member and the holder therefor are one piece. In other words, the guard member 13 and the holder 16 may be considered as one piece constituting a guard member.

Having thus described my invention, what I claim and desire by Letters Patent to secure is:

1. A safety device for a rotary molding machine having, in combination, a guard member, a holder therefor, a stationary member adapted to be supported upon the work-table of said machine, links connecting said holder to said stationary member and means to raise and lower said links, whereby said guard member may be moved toward and away from said work-table.

2. A safety device for a rotary molding machine having, in combination, a guard member, a holder therefor, a stationary member adapted to be supported upon the work-table of said machine, links connecting said holder to said stationary member, means to raise and lower said links, whereby said guard member may be moved toward and away from said work-table, and means to lock said links against vertical movement.

3. A safety device for a rotary molding machine having, in combination, a guard member, a holder therefor, a stationary member adapted to be supported upon the work-table of said machine, links connecting said holder to said stationary member, a shaft rotatably mounted upon said stationary member, a slide pivotally connected to one of said links and having sliding engagement with said shaft, means to rotate said shaft and means to lock said slide against movement relatively to said shaft, whereby said guard member may be raised or lowered and locked in position.

4. A safety device for a rotary molding machine having, in combination, a guard member, a holder therefor, a stationary member adapted to be supported upon the work-table of said machine, links connecting said holder to said stationary member, a shaft rotatably mounted upon said stationary member, a slide pivotally connected to one of said links and having sliding engagement with said shaft, a rack on said slide, a gear fast to said shaft and meshing into said rack, means to rotate said shaft and means to lock said slide against movement relatively to said shaft, whereby said guard member may be locked in position.

5. A safety device for a rotary molding machine having, in combination, a support adapted to be fastened to the work-table of said machine, a bracket adjustably mounted upon said support, a guard member, a holder for said guard member, links connecting said holder to said bracket and means to raise and lower said links, whereby said guard member may be moved toward or away from said work-table.

6. A safety device for a rotary molding machine having, in combination, a support adapted to be fastened to the work-table of said machine, a bracket adjustably mounted upon said support, a guard member, a holder for said guard member, links connecting said holder to said bracket, means to raise and lower said links, whereby said guard member may be moved toward or away from said work-table, and means to lock said links against movement, whereby said guard member may be locked in adjusted position.

7. A safety device for a rotary molding machine having, in combination, a support, a bracket slidably and rotatably mounted upon said support, means to lock said bracket to said support, a guard member, a holder for said guard member, links connecting said guard member to said bracket and means to raise and lower said links, whereby said guard member may be moved toward and away from said work-table.

8. A safety device for a rotary molding machine having, in combination, a support, a bracket slidably and rotatably mounted upon said support, means to lock said bracket to said support, a guard member, a holder for said guard member, links connecting said guard member to said bracket, means to raise and lower said links, whereby said guard member may be moved toward and away from said work-table, and means to lock said links against vertical movement, whereby said guard member may be locked in adjusted position.

In testimony whereof I have hereunto set my hand in presence of two subscribing witnesses.

GEORGE N. ROST.

Witnesses:
CHARLES S. GOODING,
SYDNEY E. TAFT.

Copies of this patent may be obtained for five cents each, by addressing the "Commissioner of Patents, Washington, D. C."